(12) United States Patent
Baisley et al.

(10) Patent No.: US 7,613,676 B2
(45) Date of Patent: Nov. 3, 2009

(54) GENERATING A DATABASE MODEL FROM NATURAL LANGUAGE EXPRESSIONS OF BUSINESS RULES

(75) Inventors: Donald Edward Baisley, Laguna Hills, CA (US); Ravi Anthony Joseph Dirckze, Mission Viejo, CA (US); Jonathan Virgil Ziebell, Trabuco Canyon, CA (US); Russel Elliot Cole, Laguna Niguel, CA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 10/899,891

(22) Filed: Jul. 27, 2004

(65) Prior Publication Data

US 2006/0026576 A1    Feb. 2, 2006

(51) Int. Cl.
*G06N 7/00* (2006.01)
*G06N 7/08* (2006.01)
(52) U.S. Cl. .................... 706/57; 715/201; 707/100
(58) Field of Classification Search ............. 706/57; 707/4, 143; 705/67
See application file for complete search history.

(56) References Cited

U.S. PATENT DOCUMENTS

| | | | |
|---|---|---|---|
| 4,974,191 A | 11/1990 | Amirghodsi | |
| 5,167,009 A | 11/1992 | Skeirik | |
| 5,197,005 A | 3/1993 | Shwartz | |
| 5,748,974 A | 5/1998 | Johnson | |
| 5,907,840 A | 5/1999 | Evans | |
| 6,023,669 A | 2/2000 | Suda | |
| 6,173,441 B1 | 1/2001 | Klein | |
| 6,523,172 B1 | 2/2003 | Martinez-Guerra | |
| 6,587,849 B1 | 7/2003 | Mason | |
| 6,640,207 B2 | 10/2003 | Witschel | |
| 6,754,321 B1 | 6/2004 | Innes | |
| 6,789,252 B1 | 9/2004 | Burke | |

(Continued)

OTHER PUBLICATIONS

Terry Halpin, Information Modeling and Relational Databases from Conceptual Analysis to Logical Design, pp. 412-454, Morgan Kaufmann Publishers, 2001.

(Continued)

*Primary Examiner*—David R Vincent
*Assistant Examiner*—Kalpana Bharadwaj
(74) *Attorney, Agent, or Firm*—Workman Nydegger (57) ABSTRACT

One embodiment of the invention is a method for generating a database model from a set of business rules. For a business rule given as input, an empty list of fact types is created. A determination of whether the business rule is a definitional rule defining that one or more propositions become true upon occurrence of an event is made. If the business rule is a definitional rule, the fact type of each of the propositions is added to the list of fact types. Otherwise, a determination of whether the business rule is an authorization rule for provision of information that comprises one or more authorized provisions of information corresponding to one or more fact types is made. If the business rule is an authorization rule for provision of information, the corresponding fact types are added to the list of fact types. For each fact type in the list of fact types, the fact type having at least one role, the role having a type, if the type of the role is not a lexical type, the type is added to a list of types. The types in the list of types are processed and the fact types in the list of fact types are processed.

15 Claims, 6 Drawing Sheets

U.S. PATENT DOCUMENTS

| | | | |
|---|---|---|---|
| 7,020,869 | B2 | 3/2006 | Abrari |
| 7,185,016 | B1 * | 2/2007 | Rasmussen ............ 707/100 |
| 7,356,522 | B2 | 4/2008 | Herrera |
| 2001/0027446 | A1 * | 10/2001 | Metcalfe ................ 705/67 |
| 2002/0107889 | A1 | 8/2002 | Stone |
| 2003/0097363 | A1 | 5/2003 | Dorsey |
| 2003/0216919 | A1 | 11/2003 | Roushar |
| 2003/0220890 | A1 * | 11/2003 | Okude .................... 706/50 |
| 2004/0030421 | A1 | 2/2004 | Haley |
| 2004/0210445 | A1 | 10/2004 | Veronese |
| 2005/0096908 | A1 | 5/2005 | Bacchiani |
| 2005/0108001 | A1 | 5/2005 | Aarskog |
| 2005/0246371 | A1 | 11/2005 | Baisley |
| 2005/0289560 | A1 | 12/2005 | Sedogbo |

OTHER PUBLICATIONS

Bryant et al., From Natural Language Requirements to Executable Models of Software Components, Sep. 24, 2003, 8 pages.

Donald Baisley and Peter Cunnningham, Business Transformation Utilizing Business Rule Technologies, Dec. 2, 2003, 18 pages.

L. Mich et al, NL-OOPs: A Requirements Analysis Tool Based on Natural Language Processing, 2002, 11 pages.

Office Action dated Dec. 6, 2007 cited in related U.S. Appl. No. 10/860,672.

Office Action dated Dec. 12, 2007 cited in related U.S. Appl. No. 10/837,299.

Perex-Gonzales et al. "GOOAL: A Graphic Object Oriented Analysis Laboratory" Nov. 2002, AMC OOPSLA '02, pp. 38-39.

Evans "A Comparison of Tule-Based and Machine Learning Methods for Identifying Non-Normal It", 2000, NPL 2000, LNCS 1835, pp. 233-240.

Office Action dated Oct. 3, 2008 cited in U.S. Appl. No. 10/837,299.

Office Action dated Oct. 5, 2007 cited in U.S. Appl. No. 10/831,679.

Office Action dated Jul. 10, 2008 cited in U.S. Appl. No. 10/831,679.

Office Action dated Nov. 28, 2007 cited in U.S. Appl. No. 10/903,452.

Halpin, "Object Role Modeling: An Overview", Microsoft White Paper, Nov. 2001, Available at: http://msdn.microsoft.com/en-us/library/aa290383.aspx.

Notice of Allowance dated Oct. 28, 2008 cited in U.S. Appl. No. 10/860,672.

Office Action dated Nov. 14, 2008 cited in U.S. Appl. No. 10/903,452.

Office Action dated Dec. 16, 2008 cited in U.S. Appl. No. 10/831,679.

Notice of Allowance dated Apr. 3, 2009 cited in U.S. Appl. No. 10/837,299.

* cited by examiner

GENERATING A DATABASE MODEL FROM NATURAL LANGUAGE EXPRESSIONS OF BUSINESS RULES

CROSS-REFERENCE TO RELATED APPLICATIONS

This application is related to the following patent applications: Ser. No. 10/836,832 entitled "Generating Programmatic Interfaces From Natural Language Expressions Of Authorizations For Provision Of Information", filed on Apr. 30, 2004; and Ser. No. 10/860,672 entitled "Generating A Logical Model Of Objects From A Representation Of Linguistic Concepts For Use In Software Model Generation", filed on Jun. 3, 2004, both assigned to the same assignee as the present application.

BACKGROUND

1. Field of the Invention

Embodiments of the invention are in the field of natural language processing and relate more specifically to generation of database models from business rules expressed in a natural language.

2. Description of Related Art

Natural language used by humans to communicate tends to be contextual and imprecise. To automate natural language processing using computerized methods, certain rules are usually imposed to confine the natural language expressions to a well-defined format. There are several applications that can provide an environment where natural language expressions may be expressed in an unambiguous format. One such application is business rules.

When business services or transactions are automated in a computer system, business rules provide business requirements on the automated system. These requirements dictate what the system should and should not do, or who can provide information to the system and who can request information from the system. However, the process of translating business rules expressed in business language into software components using human software developers tends to be error-prone and time-consuming. Automatic generation of software systems from business rules will save time and avoid the problem of errors that would occur in manual translation. One of the important parts of the generation of a software system from business rules is the generation of a database model that represents what information is stored by software components in a database for later retrieval.

There are known methods for generating a relational data model from a business vocabulary that is a set of terms and other symbols such as verbs or prepositions or combinations of these that represent fact types. When taking such a vocabulary as a conceptual schema, a relational data model can be generated following the well documented techniques described in "*Information Modeling and Relational Databases From Conceptual Analysis to Logical Design*", pages 412-454, by Terry Halpin, Morgan Kaufmann Publishers, 2001. However, the approach described does not account for business rules that establish what kinds of facts are provided as source information. Therefore, a relational model generated in this way can be impractical when used as a database model because it does not fully distinguish the kinds of information provided as source data from other kinds of information that are derived or computed from source data. Without this distinction, a database model would likely define storage of an impractical amount of redundant information. To generate a database model that defines storage of source information only, a method is needed for discovering from the business rules of a business what types of facts are provided as source information.

SUMMARY OF THE INVENTION

One embodiment of the invention is a method for generating a database model from a set of business rules. For a business rule given as input, an empty list of fact types is created. A determination of whether the business rule is a definitional rule defining that one or more propositions become true upon occurrence of an event is made. If the business rule is a definitional rule, the fact type of each of the propositions is added to the list of fact types. Otherwise, a determination of whether the business rule is an authorization rule for provision of information that comprises one or more authorized provisions of information corresponding to one or more fact types is made. If the business rule is an authorization rule for provision of information, the corresponding fact types are added to the list of fact types. For each fact type in the list of fact types, the fact type having at least one role, the role having a type, if the type of the role is not a lexical type, the type is added to a list of types. The types in the list of types are processed and the fact types in the list of fact types are processed.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a method for generating a database model from a set of business rules. For a business rule given as input, an empty list of fact types is created. A determination of whether the business rule is a definitional rule defining that one or more propositions become true upon occurrence of an event is made. If the business rule is a definitional rule, the fact type of each of the propositions is added to the list of fact types. Otherwise, a determination of whether the business rule is an authorization rule for provision of information that comprises one or more authorized provisions of information corresponding to one or more fact types is made. If the business rule is an authorization rule for provision of information, the corresponding fact types are added to the list of fact types. For each fact type in the list of fact types, the fact type having at least one role, the role having a type, if the type of the role is not a lexical type, the type is added to a list of types. The types in the list of types are processed and the fact types in the list of fact types are processed.

In the method of the present invention, fact types and classifications are determined from authorization rules and definitional rules. A database column type is determined from a reference scheme that may be defined for a role of a fact type. If a business rule imposes a limit of 1 on the cardinality of a role of a fact type, a corresponding uniqueness constraint is created and spans the database columns that correspond to the remaining roles of such fact type.

Database models resulting from the application of the method of the present invention correspond to normalized databases. By normalized database, it is meant that information data that are related are kept in separate database tables.

In the following description, numerous specific details are set forth. However, it is understood that embodiments of the invention may be practiced without these specific details. In other instances, well-known circuits, structures, and techniques have not been shown in order not to obscure the understanding of this description.

Business rules include authorization rules and definitional rules which affect the source information that is to be stored in a database system.

The method of the present invention considers the part of an authorization rule that expresses what information may be provided, apart from any consideration of who provides it or conditions under which it may be provided. The method of the present invention examines propositional expressions of authorized provisions of information in the authorization rule with respect to the use of propositional demonstrative operators, propositional interrogative operators and the interrogative operators.

The method of the present invention further considers each definitional rule which defines that one or more propositions become true upon occurrence of an event.

The method of the present invention considers these propositions apart from any consideration of the description of the triggering event or of any condition that limits applicability of the rule.

The method of the present invention also considers business rules that impose a uniqueness constraint. Such uniqueness constraint does affect the source information that is to be stored in a database system.

Many relevant linguistic concepts are used in the following description. These concepts are developed using a linguistic terminology that includes a number of terms. These terms include "expression", "nominal expression", "term", "name", "numerical literal", "textual literal", "role expression", "sentence", "simple sentence", "complex sentence", "function form", "sentence form", "parametric operator", "interrogative operator", "propositional interrogative", "reference scheme", "type", "category", "role", "supertype", and "subtype".

An expression is a symbol or combination of symbols that means something. The meaning can be anything, including a proposition, a rule, a number, etc.

A nominal expression is a category of expression that names a thing or things.

A term is a category of symbol, a symbol that denotes being of a type, i.e., a common noun. Examples: "car" denoting a category of vehicle, "bank account".

A name is a category of symbol and of nominal expression; a symbol that names an individual thing, i.e., a proper noun. Examples: "California" naming a state of the United States, "Unisys" naming the company Unisys.

A numerical literal is a category of name that denotes a number using numerals. For example, "123" meaning the number 123.

A textual literal is a category of symbol and of nominal expression; a symbol that represents words, punctuation, textual characters or a sequence of any of these by literal presentation, as in quotation marks. For example, "hello" representing the word "hello".

A role expression is a category of nominal expression. A nominal expression consists primarily of a term given in place of a placeholder in an expression based on a function form, and consists secondarily of each operator (e.g., quantifier, pronominal operator, parametric operator, interrogative operator) and object modifier applied to the term together with any expression of instances specifically referenced by the term, or, if the denoted type's range is restricted using a nominal restrictive form, that nominal restrictive form along with the expression of each argument to the function delineated by that form. Examples: "a checking account" in the expression "a checking account has the overdraw limit ($1000.00)"; "the overdraw limit ($1000.00)" in the expression "a checking account has the overdraw limit ($1000.00)".

A sentence is a category of expression; an expression that denotes a proposition (possibly an open or interrogative proposition).

A simple sentence is a category of sentence; a sentence that is stated using a single sentence form (having no logical connectives). It includes a nominal expression for each placeholder of the sentence form. Example: "Each person has a name".

A complex sentence is a category of sentence. It is a sentence that combines other sentences using a logical connective such as "if", "and", "or", etc. Example: "Each American citizen has a name and a social security number".

A function form is a category of symbol and of expression; a complex symbol that is a sequence of typed placeholders and words interspersed that delineates a function and serves as a form for invoking the function in expressions. Each typed placeholder appears in the sequence as a term denoting the placeholder's type specially marked in some way (such as by underlining).

A sentence form is a category of function form that delineates a propositional function. Example: "vendor charges price for product".

A parametric operator is a category of operator that when expressed with a term denotes a discourse referent determined by future discourse context, with singular quantification. Example: "a given" in "Each medical receptionist is authorized to provide what doctor sees a given patient".

An interrogative operator is a category of operator that, when expressed with a term in a role expression, denotes a discourse referent determined by future discourse context. The role expression is therefore a name for satisfiers in the encompassing sentence. Examples: the operator "what" in "What doctor sees what patient", the operators "which" and "what" in "Which doctor sees what patient". Note that "what" carries the meaning of "who", "when", "how", "where", "why", etc. when used as an operator on a term, e.g., in "what person", "what time" or "what date", "what method", "what location", "what purpose", etc.

A propositional interrogative is a category of operator that when expressed with a proposition denotes the truth-value of the proposition with regard to future discourse context. Example: the operator "whether" in "whether each doctor is licensed".

A reference scheme (also called an identification scheme, or an identity criterion) is a scheme by which a thing of some type can be identified by facts about the thing that relate the thing to signifiers or to other things identified by signifiers. The identifying scheme comprises the set of terms that correspond to the signifiers. Example: an employee may be identified by employee number.

A type is a classification of things (often by category or by role). A category is a role of a type in a categorization relation to a more general type. The category classifies a subset of the instances of the more general type based on some delimiting characteristic. Example: checking account is a category of account.

A role is a role of a type whose essential characteristic is that its instances play some part, or are put to some use, in some situation. The type classifies an instance based, not on a distinguishing characteristic of the instance itself (as with a category), but on some fact that involves the instance. Example: destination city is a role of a city.

A supertype is a role of a type used in relation to another type such that the other type is a category or role of the supertype, directly or indirectly. Each instance of the other type is an instance of the supertype. Examples: animal is a supertype of person (assuming person is a category of animal) and person is a supertype of driver (assuming driver is a role of a person).

A subtype is a role of a type used in relation to another type such that the subtype is a category or role of the other type, directly or indirectly. Each instance of the subtype is an instance of the other type. This is the inverse of supertype. Examples: person is a subtype of animal (assuming person is a category of animal) and driver is a subtype of person (assuming driver is a role of a person).

A fact type is a type that is a classification of facts. A fact type may be represented by a form of expression such as a sentence form, restrictive form or a mathematical form. A fact type has one or more roles, each of which is represented by a placeholder in a sentence form. Each instance of a fact type is a fact that involves one thing for each role. Example: a fact type 'person drives car' has placeholders person and car. An instance of the fact type is a fact that a particular person drives a particular car.

In one embodiment, the invention is implemented using relational data modeling. Relational modeling concepts of table and column are widely understood, so they are not discussed here.

Figure 1:
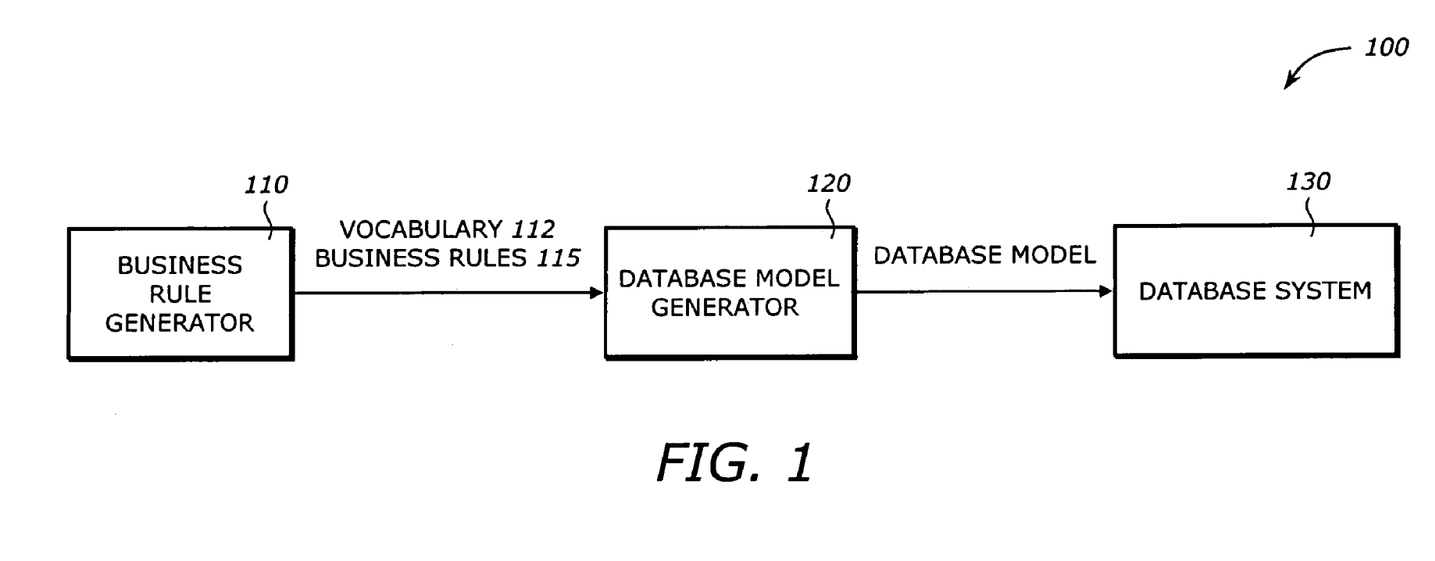
FIG. 1 is a diagram illustrating a system in which one embodiment of the invention can be practiced.

FIG. 1 is a diagram illustrating a system 100 in which one embodiment of the invention can be practiced. The system 100 includes a business rule generator 110, a database model generator 120, and a database system 130. The system 100 may be implemented by software or hardware, or a combination of hardware and software.

The business rule generator 110 generates a business vocabulary 112 and a set of business rules 115 as input to the database model generator 120. The database model generator 120 creates a database model from the input. The database model is used to define information storage in the database system 130. The system 100 may be implemented by software or hardware, or a combination of hardware and software.

The business vocabulary 112 defines terms, names and function forms. The vocabulary input further includes reference schemes for terms that are not implicitly understood to denote data values.

The business rules 115 are in a linguistic form having a predefined syntax or format that conforms to the grammatical rules of a natural language such as English. In one embodiment, these business rules may represent any of the following:

1. Obligations on the behavior of business actors. Example: "It is required that each employee wear a hardhat if the employee is in a construction zone".
2. Definitional rules that define how information is derived or computed from other information. Example: "The sales tax rate charged on a sale is the sales tax rate at the location of the sale at the time of the sale."
3. Definitional rules that define how certain propositions become facts upon the occurrence of some event. Example: "Upon the death of the president, given that the vice president remains alive, it is thereby the case that the vice president becomes the president".
4. authorizations for business actors to provide information.
5. authorizations for business actors to request information.

The database model generator 120 translates the business rules given as input 115 into a database model that can be used to describe a database in the database system 130. The database system can be used by software components that automate business activity based on the business rules. The database system 130 can be any database product that can implement an arbitrary database model such as a relational database schema.

Most business rules of type 1 and business rules of type 2 and 5 do not affect the source information that is to be stored in a database. However, rules of type 1 (if strictly enforced) and 2 can affect the normalization of the database model. Some of the business rules of type 1 as described above may affect some source information that is to be stored in the database. Examples of such affecting business rules of type 1 are those that impose a constraint of uniqueness on a role of a fact type. Business rules of types 3 and 4 as described above generally affect the source information that is to be stored in the database.

A definitional rule that defines how certain propositions become true upon the occurrence of some event has at least two parts: a description of the event and the declaration, which is a statement of a proposition that becomes true upon the event. The rule may also include as a third part a condition indicating additional circumstances that are satisfied in order for the rule to be in force. These parts can occur in any order. They are detected because they use distinct linguistic elements. The declaration is the significant part of the rule for generation of a database model. The other parts have no affect on the database model. The declaration is detected within the rule based on the grammatical structure of the language and the appearance of a word or phrase that introduces it, such as, in English, "it is thereby the case that".

The part of the rule that expresses the proposition that becomes true can use conjunction in order to assert multiple facts. For example, consider the rule "Upon a salesperson reaching $1 M in sales, it is thereby the case that the salesperson is in the Gold Club and the name of the salesperson is noted on the company website." The rule above uses the word "and" to indicate conjunction, which causes two different kinds of facts to become true upon an occurrence of the triggering event. Note that conjunction can occur using other words or forms. It is a general linguistic concept found in all natural languages.

A business rule that authorizes provision of information by a business actor indicates what information can be provided. Such indications build on three linguistic concepts (1) propositional demonstratives, (2) propositional interrogatives, and (3) interrogative operators. These concepts are easily exemplified in English or other languages. Examples in English follow:

Propositional demonstrative: "A bank manager may provide that an account is suspended." In this example, the word "that" is a propositional demonstrative for the proposition "an account is suspended". This rule allows a bank manager to provide a fact about an account, i.e., that it is suspended.

Propositional interrogative: "A bank manager may provide whether an account is suspended." In the above example, the word "whether" is a propositional interrogative for the proposition "an account is suspended". This rule allows a bank manager to provide a fact about an account (i.e., that it is suspended) and also allows a bank manager to provide the opposite fact about an account (i.e., that it is not suspended).

Interrogative operator: "A bank manager may provide what account is suspended." In the above example, the word "what" is an interrogative operator acting on the term "account" in the scope of the proposition "account is suspended". This rule allows a bank manager to provide which accounts are suspended, and by omission, which are not.

The three concepts are distinct in usage and are not mixed except when using conjunction (explained below). For example, a propositional interrogative (such as "whether") is not used in an authorization rule on a proposition containing an interrogative operator (such as "what"). However, multiple interrogative operators can occur in a single proposition. For example: "A bank manager may provide which loan officer is assigned to what loan." In the above example, "which" and "what" are both interrogative operators indicating that a bank manager can provide the overall assignment of loan officers to loans.

In each of the three cases above it is possible for the rule to be conditioned on other information. For example, the first rule could be: "A bank manager may provide whether an account is suspended if the account is with a bank managed by the bank manager." The condition does not affect what information can be provided other than to limit the circumstances in which the provision of information is allowed. Such conditions do not affect the model of a database that stores the information. For this reason, conditions placed on authorization rules can be ignored in the method of the present invention.

Note that the three linguistic concepts above are represented by many different words in English (e.g., "which" for "what") and by many different words in other languages. The present invention does not consider specific words, but the three specific linguistic concepts described above.

A single authorization rule can use conjunction in order to authorize multiple kinds of information. For example, consider the rule "A bank manager may provide what credit limit is on an account and whether the account is suspended." The rule above uses the word "and" to indicate conjunction, which causes authorization to be granted, in this case, for two kinds of facts. Note that conjunction can occur using other words or forms. It is a general linguistic concept found in all natural languages.

Rules of types 3 and 4 determine what types of facts can be stored using the method of the present invention. Rules of type 1 and 2 can affect the resulting data structures. A rule of type 1, if it is strictly enforced, or of type 2 that limits the cardinality of a fact type role to be single-valued allows facts of that fact type to be combined with other fact types in a single table. For example, the rule, "it is required that each employee has exactly one employee number", affects the generated database model by allowing facts relating employees to their employee numbers to be combined into the same table as one used to indicate that an employee exists.

Elements of one embodiment of the invention may be implemented by hardware, firmware, software or any combination thereof. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium. The "processor readable or accessible medium" or "machine readable or accessible Medium" may include any medium that can store information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine-readable code to perform the operations described above. The term "data" here refers to any type of information that is encoded for machine-readable purposes. Therefore, it may include program, code, data, file, etc.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may recursively call itself. When the called process terminates, control is returned to the calling process. When all the recursive calls have ended, control is returned to the initial calling process. A process may correspond to a method, a program, a procedure, etc.

Figure 2:
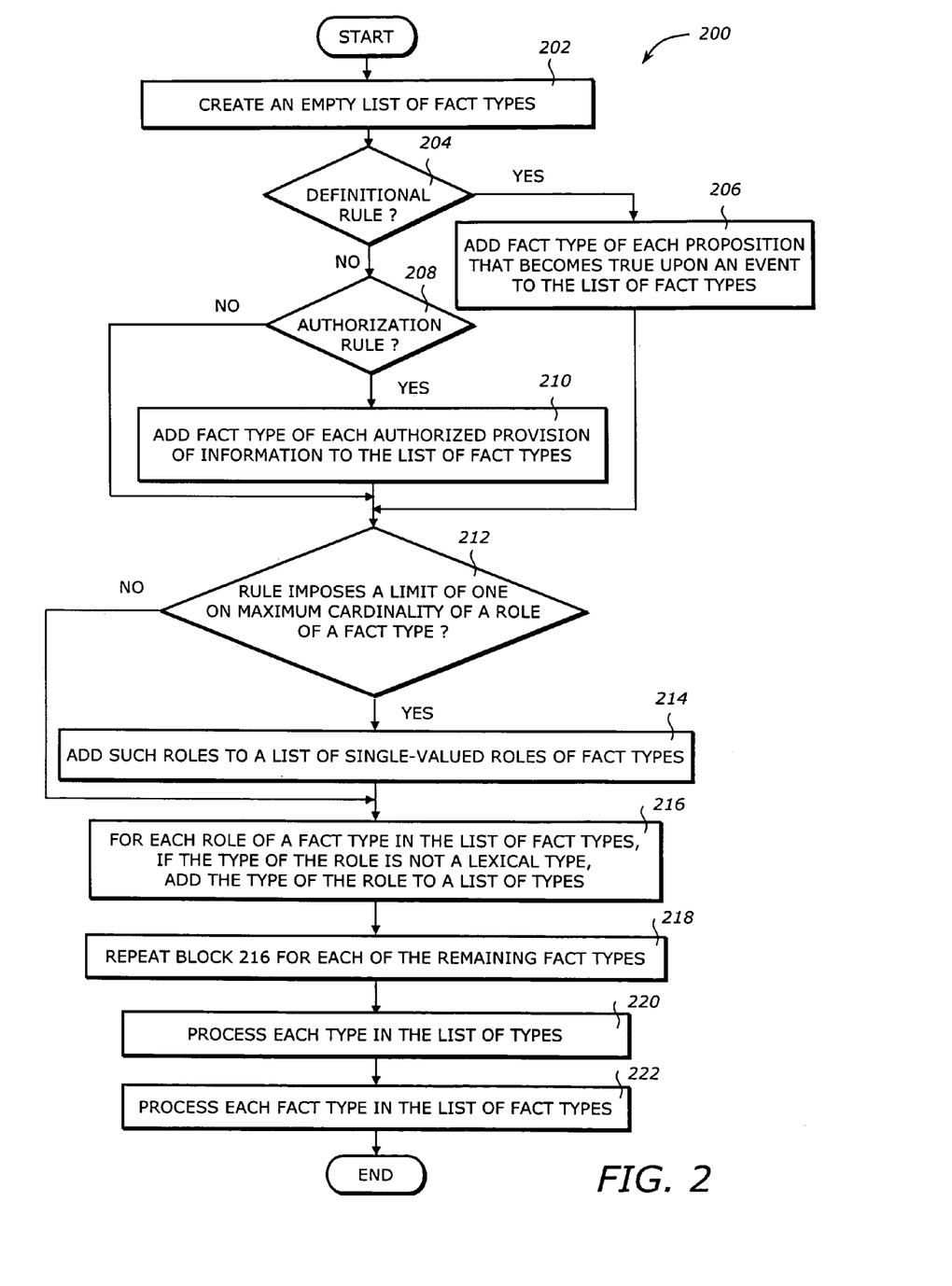
FIG. 2 is a flowchart illustrating a process 200 for transforming a business rule into a database model according to one embodiment of the invention.

FIG. 2 is a flowchart illustrating a process 200 for transforming a business rule into a database model according to one embodiment of the invention. Upon Start, process 200 creates an empty list of fact types (block 202). Process 200 determines whether the rule is a definitional rule that defines that a proposition becomes true upon the occurrence of an event (block 204). If it is, process 200 adds the fact type of each proposition that becomes true to the list of fact types (block 206) and continues at block 212. Otherwise, process 200 determines whether the rule is an authorization rule for provision of information (block 208). If it is, process 200 adds the fact type of each authorized provision of information to the list of fact types (block 210) then continues at block 212. Otherwise, process 200 continues at block 212. Process 200 determines whether the rule imposes a limit that a role of a fact type has a maximum cardinality of one (block 212). If it does, process 200 adds the role to a list of single-valued roles of fact types (block 214). For each role of a fact type in the list of fact types, if the type of the role is not a lexical type, process 200 adds the type of the role of the fact type to the list of types (block 216). Process 200 repeats block 216 for each of the remaining fact types in the list of fact types (block 218). Next, process 200 processes each type in the list of types (block 220). Process 200 processes each fact type in the list of fact types (block 222). Process 200 then terminates.

Figure 3:
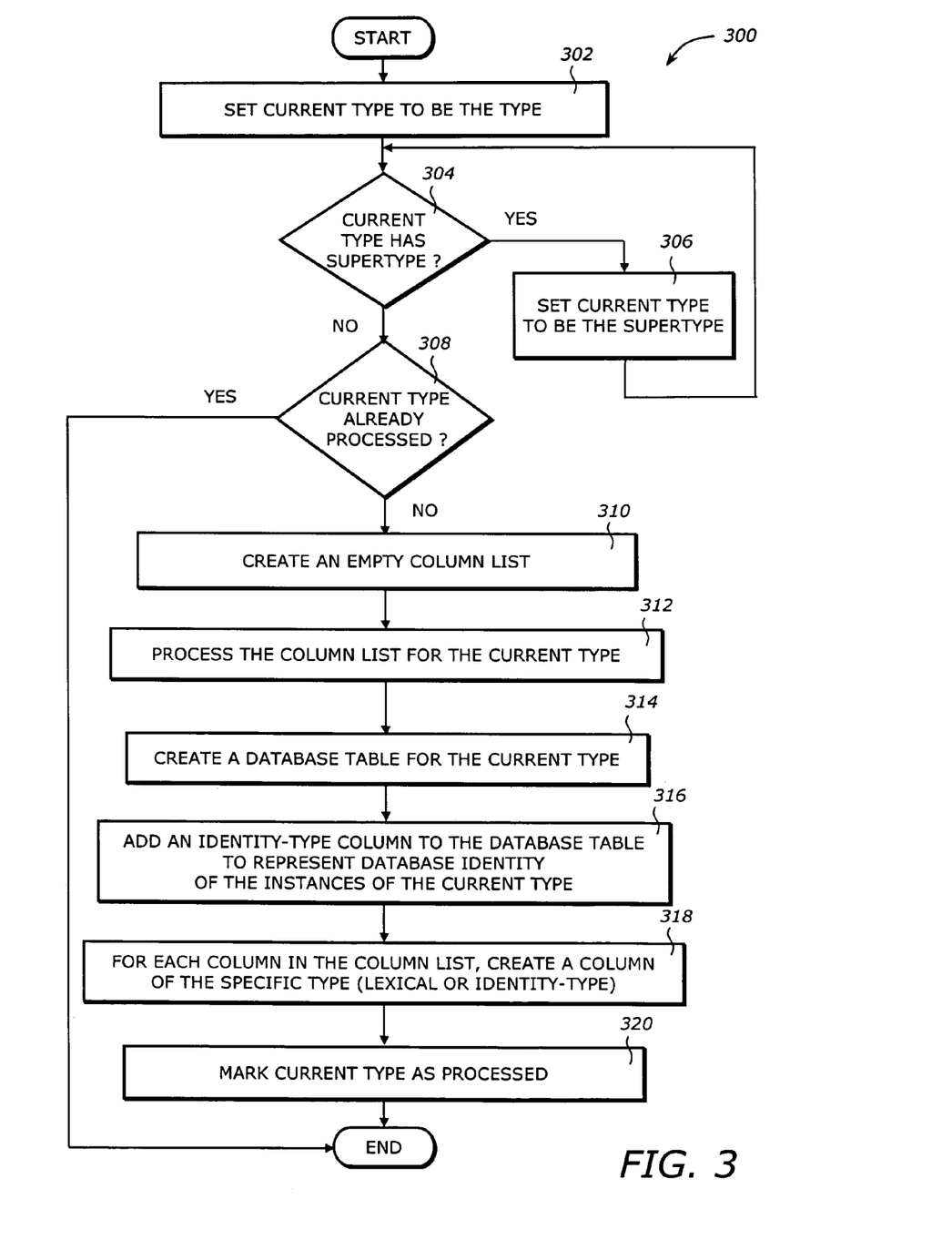
FIG. 3 is a flowchart illustrating a process 300 for processing a type according to one embodiment of the invention. Process 300 is called by block 220 of process 200 (FIG. 2) to process a type in the list of types.

FIG. 3 is a flowchart illustrating a process 300 for processing a type according to one embodiment of the invention. Process 300 is called by block 220 of process 200 (FIG. 2) to process a type in the list of types.

Figure 4:
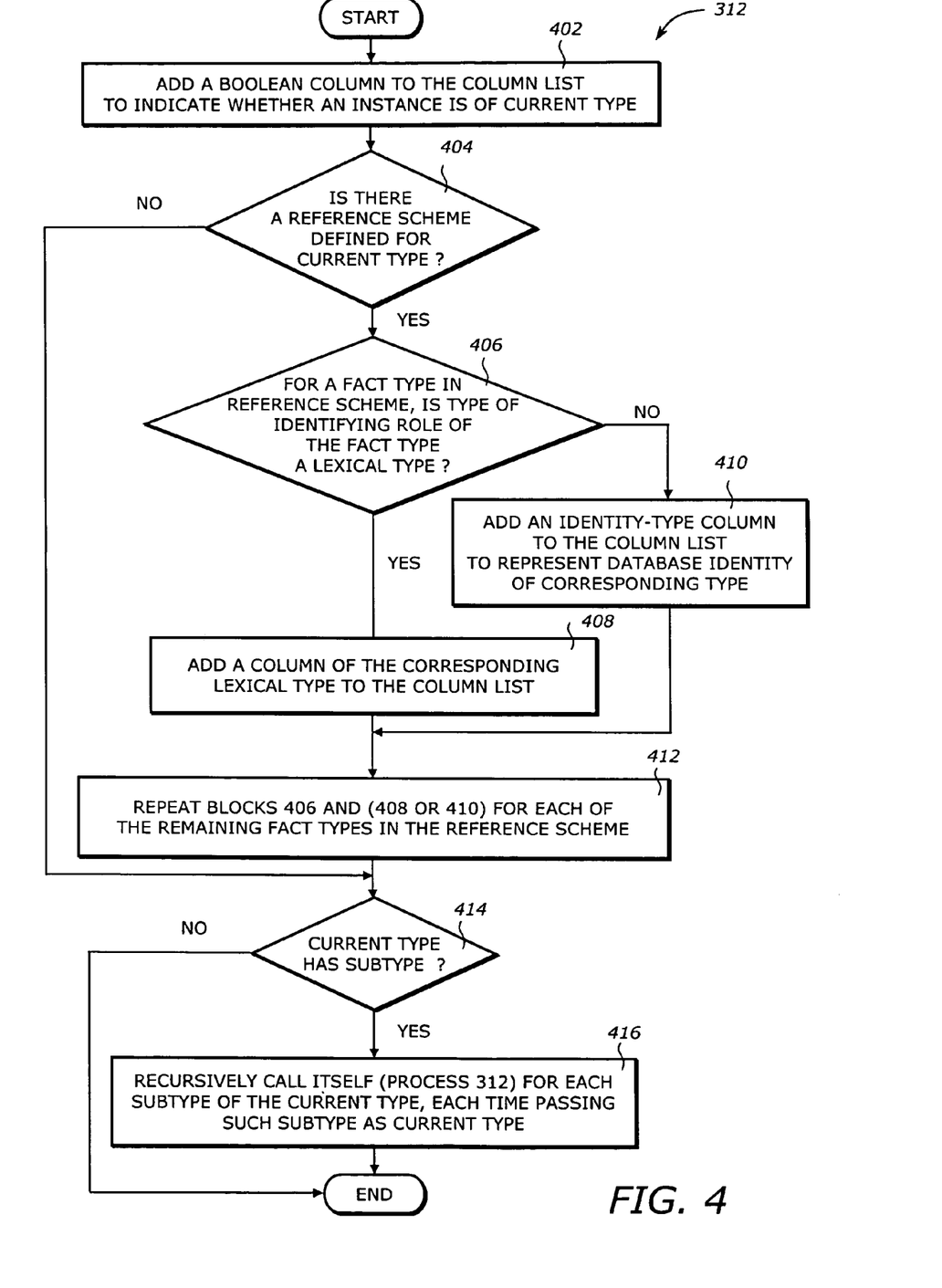
FIG. 4 is a flowchart illustrating process 312 of process 300 (FIG. 3) for processing the column list for a type according to one embodiment of the invention.

Upon Start, process 300 sets a current type to the type (block 302). Process 300 checks whether the current type has a supertype (block 304). If it does, process 300 sets the current type to be the supertype (block 306) and loops back to block 304 to check whether this current type has a supertype. This looping back is done until the highest level supertype is reached. If the current type does not have a supertype, process 300 determines whether the current type is already processed (block 308). If it is, process 300 terminates. Otherwise, process 300 creates an empty column list (block 310). Process 300 processes the column list for the current type (block 312). An embodiment of this processing is as shown in FIG. 4. Process 300 creates a database table for the current type (block 314). Process 300 adds an identity type column to the database table to represent the database identity of the instances of that type (block 316). For each column in the column list, process 300 creates a column of either the specific lexical type or identity type (as returned from block 312 or from block 316 above). Process 300 marks the current type as processed (block 320) then terminates.

FIG. 4 is a flowchart illustrating process 312 for processing the column list for a type according to one embodiment of the invention. Upon Start, process 312 adds a Boolean column to the column list to indicate whether each instance is of this type (block 402). Process 312 determines whether there is a reference scheme defined for the type (block 404). If there is not, process 312 continues at block 414. Otherwise, process 312 determines, for a fact type in the reference scheme, whether the type of the identifying role of the fact type is a lexical type (block 406). If it is a lexical type, process 312 adds a column of the corresponding lexical type to the column list (block 408). Otherwise, process 312 adds an identity-type column to the column list to represent the database identity of the corresponding type (block 410). Process 312 repeats blocks 406-410 for each of the remaining fact types in the reference scheme (block 412). Process 312 marks the type indicating that it has been processed (block 414). Process 312 determines whether the type has any subtype (block 416). If it does not have any subtype, process 312 terminates. Otherwise, for each of the subtypes that have not been marked as already processed, process 312 recursively calls itself to process the column list, passing the subtype as a current type (block 418). Process 312 then terminates.

Figure 5:
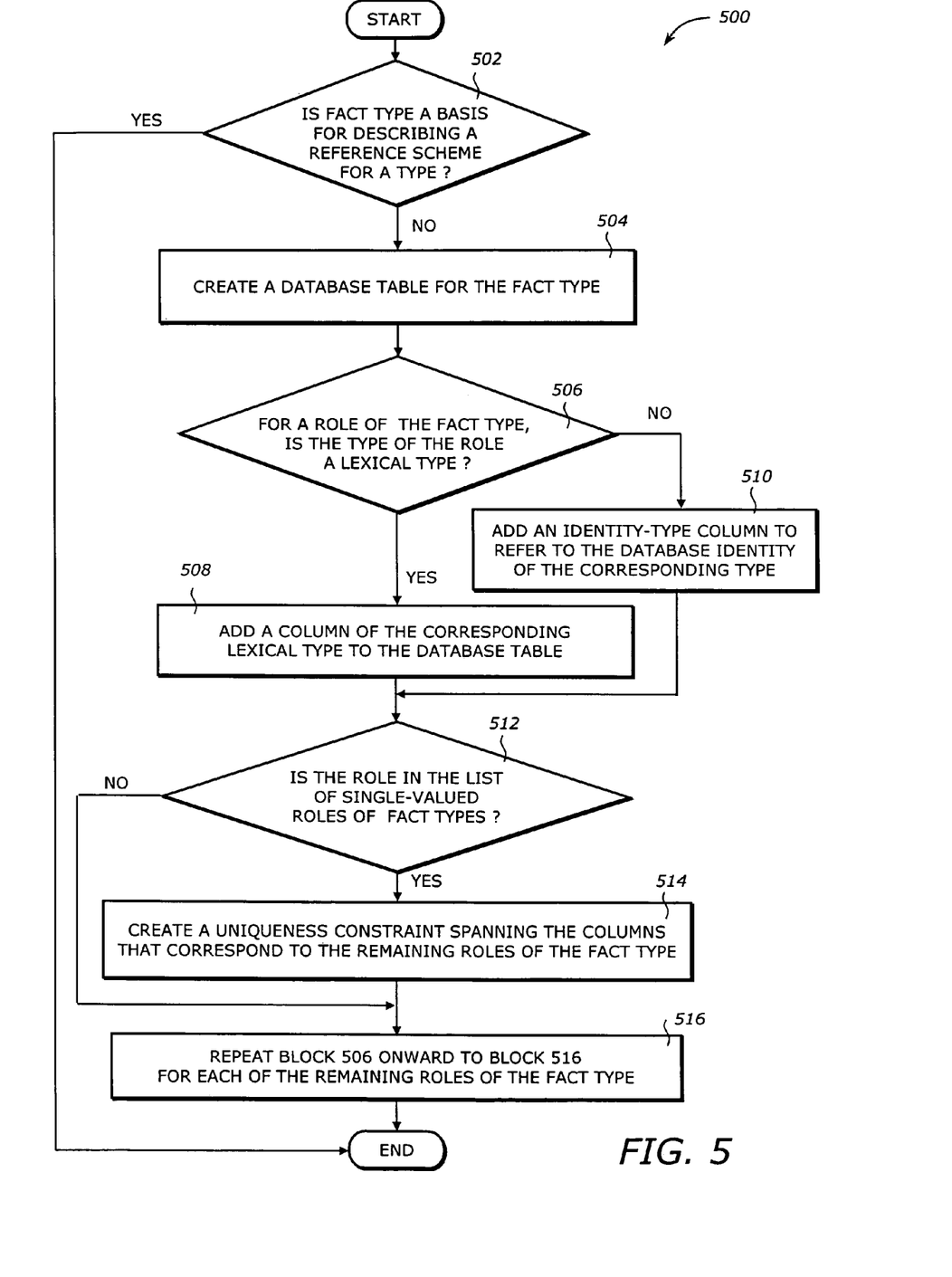
FIG. 5 is a flowchart illustrating a process 500 for processing a fact type according to one embodiment of the invention. Process 500 is called by block 222 of process 200 (FIG. 2) to process a fact type in the list of fact types.

FIG. 5 is a flowchart illustrating a process 500 for processing a fact type according to one embodiment of the invention. Process 500 is called by block 222 of process 200 (FIG. 2) to process a fact type in the list of fact types.

Upon Start, process 500 determines whether the fact type is a basis for describing a reference scheme for a type (block 502). If it is, process 500 terminates. If it is not, process 500 creates a database table for the fact type (block 504). For a role of the fact type, process 500 determines whether the type of the role is a lexical type (block 506). If it is, process 500 adds a column of the corresponding lexical type to the database table (block 508) then continues at block 512. Otherwise, process 500 adds an identity-type column to refer to the database identity of the corresponding type (block 510). Next, process 500 determines whether the role is in the list of singled-valued roles of fact types (block 512). If it is not, process 500 continues at block 516. Otherwise, process 500 creates a uniqueness constraint spanning the columns that correspond to the remaining roles of the fact type (block 514) then continues at block 516. Next, process 500 repeats block 506 onward to 516 for each of the remaining roles of the fact type (block 516). Process 500 then terminates.

The technique of generating a database model from a set of business rules and vocabulary may be further described by the following pseudo code.

Code Section 1

Processing Business Rules

1. For each business rule given as input:
   1.1. Determine whether the rule is a definitional rule that defines that a proposition become true upon the occurrence of some event.
      1.1.1. If yes, add the fact type of each proposition that becomes true to a list of fact types for further processing
   1.2. Determine if the rule is an authorization rule for provision of information.
      1.2.1. If yes, add the fact type of each authorized provision of information to the list of fact types for further processing
   1.3. Determine if the rule imposes a limit that a role of a fact type has a maximum cardinality of one
      1.3.1. If yes, add the role to a list of single-valued roles of fact types for future reference.
2. For each fact type in the fact type list:
   2.1. For each role of the fact type
      2.1.1. If the type of the role is not of a lexical type
         2.1.1.1. Add the type to a list of types for further processing
3. For each type in the type-list
   3.1. process the type as in Program 2
4. For each fact type in the fact-type-list
   4.1. process the fact type as in Program 4

Code Section 2

Processing a Type

1. While the current type has a supertype
   1.1. Set the current type to be the supertype
2. If the current type has not been processed
   2.1. Create an empty column list
      2.1.1. process the column list for the current type as in Code section 3
   2.2. Create a database table for the type
   2.3. Add an identity-type column to the database table to represent the database identity of the instances of that type.
   2.4. For each column in the column list
      2.4.1. Create a column of the specific lexical type or identity type from Code section 3 or from 2.3 above
   2.5. Mark the type as processed.

Code Section 3

Processing Column List for a Type

1. Add a boolean column to the column list to indicate whether each instance is of this type 2. If there is a reference scheme defined for the type
   2.1. For each fact type in the reference scheme
      2.1.1. If the type of the identifying role of the fact type is a lexical type
         2.1.1.1 Add a column of the corresponding lexical type to the column list
      2.1.2. Otherwise
         2.1.2.1. Add an identity-type column to the column list to represent the database identity of the corresponding type
3. Mark the type as processed
4. For each subtype of the type if the subtype has not been marked as processed
   4.1. process the column list as in Code section 3 for the subtype.

Code Section 4

Processing a Fact Type

1. If the fact type is not a basis for describing a reference scheme for a type
   1.1. Create a database table for the fact type
   1.2. For each role of the fact type
      1.2.1. If the type of the role is a lexical type
         1.2.1.1.1. Add a column of the corresponding lexical type to the table
      1.2.2. otherwise
      1.2.2. Add an identity-type column to refer to the database identity of the corresponding type
      1.2.3. If the role is in the list of singled-valued roles of fact types
         1.2.3.1. Create a uniqueness constraint spanning the columns that correspond to the remaining roles of the fact type.

The following example further illustrates the technique described above:

Terms:
employee number
text
name
date
business actor
interrogative
employee—a category of business actor
manager—a category of employee
customer—a category of business actor Fact Type Sentence Forms:
business actor may provide interrogative
employee has name
employee is assigned employee number
employee is manager
employee reports to manage
manager oversees employee
employee serves customer on date Generalization Relationships
A name is a role of a text
An employee is a category of business actor
A manager is a category of employee
A customer is a category of business actor Reference Schemes
An "employee" is identified by "employee number"
A "customer" is identified by name Rule Statements:
Rule 1: It is required that each employee serves at most one customer on any given date
Rule 2: Each business actor may provide new employee has what name and whether the employee is a manager.
Rule 3: Upon new employee, it is thereby the case that the employee is assigned the next available employee number.
Rule 4: Each manager may provide what customer has what name
Rule 5: Each manager may provide what employee served what customer on what date.

Note that Rule 1 is a business rule of type 1 (discussed previously) imposing an obligation on the behavior of business actors; Rules 2, 4, and 5 is of type 4 (authorizations for business actors to provide information); Rule 3 is of type 3 (definitional rule that define how certain propositions become facts upon occurrence of some event).

Steps 1.1 and 1.2 of Code section 1 will result in the following fact type list:
employee has name
employee is assigned employee number
customer has name
employee served customer on date.

Step 2 of Code Section 1 will Result in the Following Type List
employee
customer Step 1.3 of Code Section 1 will Result in the Following List of Single-Valued Roles:
customer Step 3 of Code Section 1 will Result in the Following Table(s) being Created:

```
Business_Actor {
Identity-type identity_column;
Boolean is_employee
Boolean is_customer
Character-string customer_name;
Number employee_number;
}
```

Step 4 of Code Section 1 will Result in the Following Database Tables being Created (from the List of Fact Types):

The following table is created for the fact type of the authorized provision of information "employee has name" in the authorization rule 2:

```
Employee_Has_Name {
Identity-type identity_from_business_actor
Text Name
}
```

No database table is created for the fact type of the proposition "employee is assigned an employee number" in the definitional rule 3 because this fact type is the basis for describing the reference scheme for the type "employee".

No database table is created for the fact type of the authorized provision of information "customer has name" in the authorization rule 4 because this fact type is the basis for the reference scheme of the type "customer".

The following table is created for the fact type of the authorized provision of information "employee served customer on date" in the authorization rule 5:

```
Employee_Served_Customer_On_Date {
   Identity-type identity_from_business_actor_for_employee
   Identity-type identity_from_business_actor_for_customer
   Date date_served
}
```

Code Section 4 will Result in the Following Uniqueness Constraint:

Due to the single-valued role "customer" of the fact type of the proposition "employee serves customer on date" in the obligation rule 1, a uniqueness constraint on Employee_Served_Customer_On_Date is created, spanning the columns "identity_from_business_actor_for_employee" and "date_served" which correspond to the remaining roles of the fact type.

Figure 6:
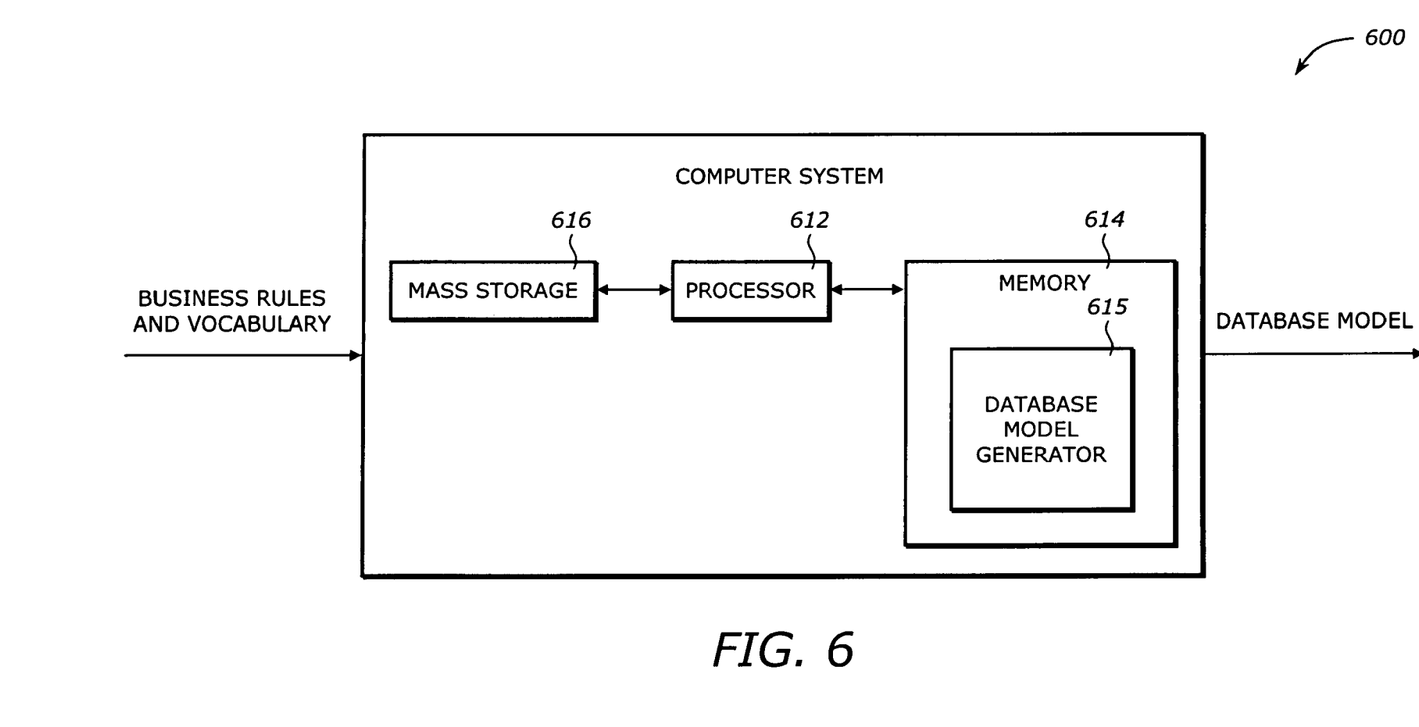
FIG. 6 is a diagram illustrating a computer system in which one embodiment of the invention can be practiced.

FIG. 6 is a diagram illustrating a computer system 600 in which one embodiment of the invention can be practiced.

The computer system 600 includes a processor 612, a memory 614, and a mass storage device 616. The computer system 600 receives a stream of input representing a set of business rules and vocabulary, processes the business rules and the vocabulary in accordance to the method of the present invention, and outputs a database model.

The processor 612 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 614 stores system code and data. The memory 614 is typically implemented with dynamic random access memory (DRAM) or static random access memory (SRAM). The system memory may include program code or code segments implementing one embodiment of the invention. The memory 614 includes a database model generator module 615 of the present invention when loaded from mass storage 616. The database model generator module 615 implements all or part of the database model generator 120 shown in FIG. 1. The database model generator module 615 may also simulate the generating functions described herein. The database model generator module 615 contains instructions that, when executed by the processor 612, cause the processor to perform the tasks or operations as described above.

The mass storage device 616 stores archive information such as code, programs, files, data, databases, applications, and operating systems. The mass storage device 616 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 616 provides a mechanism to read machine-accessible media. The machine-accessible media may contain computer readable program code to perform tasks as described above.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A computerized method for generating a normalized database model from natural language expressions of business rules comprising:

accessing a plurality of business rules, the business rules being in a linguistic form having a predefined syntax or format that conforms to grammatical rules of a natural language, and wherein the business rules comprise one or more definitional rules or authorization rules, wherein definitional rules define how information is derived or computed from other information or define how certain propositions become facts upon the occurrence of one or more events, and wherein definitional rules that define how certain propositions become true upon the occurrence of some event have at least a description of one or more events and one or more declarations, which are statements of propositions, each proposition including a fact type, that become true upon the event and wherein the authorization rules define authorizations of business actors to provide information or to request information;

creating a first empty list of fact types;

for each business rule that is a definitional rule, and based on the rules being definitional rules, adding all of the fact types of the business rule to the first list, the fact types being the declarations which are the statements of propositions, wherein the fact types are expressed in a sentence form, and wherein each of the fact types includes one or more roles, each of which is represented by a placeholder in the sentence form;

for each business rule that is an authorization rule for provision of information indicating what information can be provided by a business actor, that comprises one or more authorized provisions of information corresponding to one or more fact types, and based on the rules being authorization rules for provision of information indicating what information can be provided by a business actor, adding the corresponding fact types to the first list, the fact type being expressed in a sentence form and wherein each of the fact types includes one or more roles, each of which is represented by a placeholder in the sentence form;

for each role of each fact type in the first list, the role having a type, if the type of the role is not of a lexical type, adding the type to a second list of types;

processing the types in the second list to create one or more database tables for the types in the second list; and processing the fact types in the first list by determining for each of the fact types, if a fact type is a basis for describing a pre-defined reference scheme for the fact type, the reference scheme being a pre-defined scheme by which a thing of some type is identified by relating the thing to signifiers or to other things identified by signifiers, and for each fact type in the second list which is not a basis for describing a predefined reference scheme, creating a database table for the fact type, the database table including a type column for each role of the fact type, while not creating a database table for each fact type in the second list which is a basis for describing a pre-defined reference scheme.

2. The method of claim 1 further comprises:

for each business rule, determining whether the business rule imposes a limit that a role of a fact type has a maximum cardinality of one; and if the business rule imposes such limit, adding the role of a fact type that has a maximum cardinality of one to a third list of single-valued roles.

3. The method of claim 1 wherein processing the types in the second list comprises:
setting a current type to a first type in the second list;
if the current type has a supertype,
setting the current type to be the supertype, and
repeating setting the current type to be the supertype until the current type does not have a supertype; else,
if the current type has not been processed,
creating an empty column list,
processing the empty column list for the current type,
creating a database table for the current type,
adding an identity-type column to the database table to represent database identity of instances of the current type,
creating, for each column in a column list, a column of lexical type or of identity-type, and
marking the current type as processed.

4. The method of claim 3 wherein processing the empty column list for the current type comprises:
adding a Boolean column to the column list to indicate whether an instance is of the current type;
if there is a reference scheme defined for the current type, the reference scheme including one or more fact types,
for each of the fact types in the reference scheme, the fact type having an identifying role which has a type:
if the type of the identifying role of the fact type is a lexical type,
adding the column of the lexical type to the column list; else,
adding an identity-type column to the column list to represent database identity of the type of the identifying role of the fact type; and
marking the current type as processed.

5. The method of claim 4 further comprising:
if the current type has a subtype and the subtype has not been marked as processed, repeating processing the empty column list for the current type using the subtype as the current type.

6. The method of claim 2 wherein processing the fact types in the first list comprises:
if a fact type in the first list is not a basis for describing a reference scheme for a type:
(1) creating a database table for the fact type, the fact type having one or more roles, each of the roles having a type;
(2) for a role of the roles of the fact type,
if the type of the role is a lexical type,
adding a column of the lexical type to the database table, else,
adding an identity-type column to refer to database identity of the type;
if the role is in the list of single-valued roles of fact types,
creating a uniqueness constraint spanning columns that correspond to remaining roles of the fact type.

7. The method of claim 6 further comprising:
repeating the operation (2) onward for each of the remaining roles of the fact type.

8. An article of manufacture for generating a normalized database model from natural language expressions of business rules comprising:
a machine-accessible storage medium including data that, when accessed by a machine, cause the machine to perform the operations of claim 1.

9. The article of manufacture of claim 8 wherein the data further comprise data that, when accessed by the machine, cause the machine to perform operations comprising:
for each business rule, determining whether the business rule imposes a limit that a role of a fact type has a maximum cardinality of one; and
if the business rule imposes such limit, adding the role of a fact type that has a maximum cardinality of one to a third list of single-valued roles.

10. The article of manufacture of claim 8 wherein the data causing the machine to perform processing the types in the second list comprise data that, when accessed by the machine, cause the machine to perform operations comprising:
setting a current type to a first type in the second list of types;
if the current type has a supertype,
setting the current type to be the supertype, and
repeating setting the current type to be the supertype until the current type does not have a supertype; else,
if the current type has not been processed,
creating an empty column list,
processing the empty column list for the current type,
creating a database table for the current type,
adding an identity-type column to the database table to represent database identity of instances of the current type,
creating, for each column in a column list, a column of lexical type or of identity-type, and
marking the current type as processed.

11. The article of manufacture of claim 10 wherein the data causing the machine to perform processing the empty column list for the current type comprise data that, when accessed by the machine, cause the machine to perform operations comprising:
adding a Boolean column to the column list to indicate whether an instance is of the current type;
if there is a reference scheme defined for the current type, the reference scheme including one or more fact types,
for each of the fact types in the reference scheme, the fact type having an identifying role which has a type:
if the type of the identifying role of the fact type is a lexical type, adding the column of the lexical type to the column list; else,
adding an identity-type column to the column list to represent database identity of the type of the identifying role of the fact type; and
marking the current type as processed.

12. The article of manufacture of claim 11 wherein the data further comprise data that, when accessed by the machine, cause the machine to perform operations comprising:
if the current type has a subtype and the subtype has not been marked as processed, repeating processing the empty column list for the current type using the subtype as the current type.

13. The article of manufacture of claim 9 wherein the data causing the machine to perform processing the fact types in the list of fact types comprise data that, when accessed by the machine, cause the machine to perform operations comprising:
if a fact type in the list of fact types is not a basis for describing a reference scheme for a type:
(1) creating a database table for the fact type, the fact type having one or more roles, each of the roles having a type;
(2) for a role of the roles of the fact type,
if the type of the role is a lexical type,
adding a column of the lexical type to the database table, else, adding an identity-type column to refer to database identity of the type;

if the role is in the list of single-valued roles of fact types, creating a uniqueness constraint spanning columns that correspond to the remaining roles of the fact type.

14. The article of manufacture of claim 13 wherein the data further comprise data that, when accessed by the machine, cause the machine to perform operations comprising:

repeating the operation (2) onward for each of the remaining roles of the fact type.

15. A system for generating a normalized database model from natural language expressions of business rules comprising:

a processor; and a memory coupled to the processor, the memory containing instructions that, when executed by the processor, cause the processor to perform the following acts:

accessing a plurality of business rules, the business rules being in a linguistic form having a predefined syntax or format that conforms to grammatical rules of a natural language, and wherein the business rules comprise one or more definitional rules or authorization rules, wherein definitional rules define how information is derived or computed from other information or define how certain propositions become facts upon the occurrence of one or more events, and wherein definitional rules that define how certain propositions become true upon the occurrence of some event have at least a description of one or more events and one or more declarations, which are statements of propositions, each proposition including a fact type, that become true upon the event and wherein the authorization rules define authorizations of business actors to provide information or to request information;

creating a first empty list of fact types;

for each business rule that is a definitional rule, and based on the rules being definitional rules, adding all of the fact types of the business rule to the first list, the fact types being the declarations which are the statements of propositions, wherein the fact types are expressed in a sentence form, and wherein each of the fact types includes one or more roles, each of which is represented by a placeholder in the sentence form;

for each business rule that is an authorization rule for provision of information indicating what information can be provided by a business actor, that comprises one or more authorized provisions of information corresponding to one or more fact types, and based on the rules being authorization rules for provision of information indicating what information can be provided by a business actor, adding the corresponding fact types to the first list, the fact type being expressed in a sentence form and wherein each of the fact types includes one or more roles, each of which is represented by a placeholder in the sentence form;

for each business rule, determine whether the business rule imposes a limit that a role of a fact type has a maximum cardinality of one, and if the business rule imposes such limit, add the role of a fact type that has a maximum cardinality of one to a third list of single-valued roles;

for each role of each fact type in the first list, the role having a type, if the type of the role is not of a lexical type, adding the type to a second list of types;

processing the types in the second list to create one or more database tables for the types in the second list, by:

setting a current type to a first type in the second list of types;

if the current type has a supertype, setting the current type to be the supertype, and repeating setting the current type to be the supertype until the current type does not have a supertype; else if the current type has not been processed, creating an empty column list, processing the empty column list for the current type including:

adding a Boolean column to the column list to indicate whether an instance is of the current type;

if there is a reference scheme defined for the current type, the reference scheme including one or more fact types, for each of the fact types in the reference scheme, the fact type having an identifying role which has a type:

if the type of the identifying role of the fact type is a lexical type, adding the column of the lexical type to the column list; else, adding an identity-type column to the column list to represent database identity of the type of the identifying role of the fact type; and marking the current type as processed;

creating a database table for the current type, adding an identity-type column to the database table to represent database identity of instances of the current type, creating, for each column in a column list, a column of lexical type or of identity-type, and marking the current type as processed;

if the current type has a subtype and the subtype has not been marked as processed, repeating processing the empty column list for the current type using the subtype as the current type; and processing the fact types in the first list by determining for each of the fact types. if a fact type is a basis for describing a pre-defined reference scheme for the fact type. the reference scheme being a pre-defined scheme by which a thing of some type is identified by relating the thing to signifiers or to other things identified by signifiers, and for each fact type in the second list which is not a basis for describing a predefined reference scheme, creating a database table for the fact type, the database table including a type column for each role of the fact type, while not creating a database table for each fact type in the second list which is a basis for describing a predefined reference scheme by:

if a fact type in the list of fact types is not a basis for describing a reference scheme for a type;

(1) creating a database table for the fact type, the fact type having one or more roles, each of the roles having a type;

(2) for a role of the roles of the fact type, if the type of the role is a lexical type, adding a column of the lexical type to the database table, else, adding an identity-type column to refer to database identity of the type;

if the role is in the list of single-valued roles of fact types, creating a uniqueness constraint spanning columns that correspond to the remaining roles of the fact type; and repeating the operation (2) onward for each of the remaining roles of the fact type.

* * * * *